United States Patent
Kautzsch et al.

(10) Patent No.: US 7,832,279 B2
(45) Date of Patent: Nov. 16, 2010

(54) SEMICONDUCTOR DEVICE INCLUDING A PRESSURE SENSOR

(75) Inventors: Thoralf Kautzsch, Dresden (DE); Boris Binder, Dresden (DE); Dirk Meinhold, Dresden (DE); Ben Rosam, Dresden (DE); Bernd Foeste, Dresden (DE); Andreas Thamm, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 78 days.

(21) Appl. No.: 12/208,897

(22) Filed: Sep. 11, 2008

(65) Prior Publication Data

US 2010/0058876 A1    Mar. 11, 2010

(51) Int. Cl.
*G01L 7/00* (2006.01)
(52) U.S. Cl. ........................................ 73/754
(58) Field of Classification Search ............ None
See application file for complete search history.

(56) References Cited

U.S. PATENT DOCUMENTS

| | | | |
|---|---|---|---|
| 5,266,827 A * | 11/1993 | Kato ........................ 257/417 |
| 5,343,064 A | 8/1994 | Spangler et al. |
| 5,531,121 A * | 7/1996 | Sparks et al. ................ 73/716 |
| 5,659,196 A | 8/1997 | Honda |
| 6,012,336 A | 1/2000 | Eaton et al. |
| 6,229,190 B1 | 5/2001 | Bryzek et al. |
| 6,704,185 B2 | 3/2004 | Chatzandroulis et al. |
| 7,207,227 B2 | 4/2007 | Rangsten et al. |
| 7,402,449 B2 | 7/2008 | Fukuda et al. |
| 7,555,956 B2 * | 7/2009 | Benzel et al. ................ 73/714 |
| 2008/0128840 A1 * | 6/2008 | Benzel ........................ 257/415 |
| 2008/0178681 A1 | 7/2008 | Asada et al. |
| 2009/0266170 A1 * | 10/2009 | Murashige et al. ............ 73/715 |
| 2010/0002543 A1 * | 1/2010 | Schlosser et al. ............ 367/181 |

* cited by examiner

*Primary Examiner*—Andre J Allen
(74) *Attorney, Agent, or Firm*—Dicke, Billig & Czaja, PLLC (57) ABSTRACT

A semiconductor device includes a first cavity within a semiconductor substrate and a second cavity within the semiconductor substrate. The second cavity is open to an atmosphere and defines a first lamella between the first cavity and the second cavity. The semiconductor device includes a first sense element configured for sensing a pressure on the first lamella.

25 Claims, 7 Drawing Sheets

SEMICONDUCTOR DEVICE INCLUDING A PRESSURE SENSOR

BACKGROUND

Pressure sensors are typically used to measure the pressure of a liquid or a gas, such as air. Pressure sensors typically provide an output signal that varies based on the pressure sensed by the pressure sensor. One type of pressure sensor includes a stand-alone pressure sensor that is coupled to or bonded to a sensor circuit, such as an application-specific integrated circuit (ASIC). This type of pressure sensor is expensive to fabricate. Connecting this type of pressure sensor to a sensor circuit is also expensive. Another type of pressure sensor is a pressure capsule (e.g., a polysilicon plate) that is integrated with a sensor circuit, such as an ASIC, during a back-end-of-line (BEOL) process. This type of pressure sensor is also expensive to produce since several additional mask levels are used to fabricate the pressure sensor and the pressure sensor uses a significant amount of space of the ASIC.

For these and other reasons, there is a need for the present invention.

SUMMARY

One embodiment provides a semiconductor device. The semiconductor device includes a first cavity within a semiconductor substrate and a second cavity within the semiconductor substrate. The second cavity is open to an atmosphere and defines a first lamella between the first cavity and the second cavity. The semiconductor device includes a first sense element configured for sensing a pressure on the first lamella.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
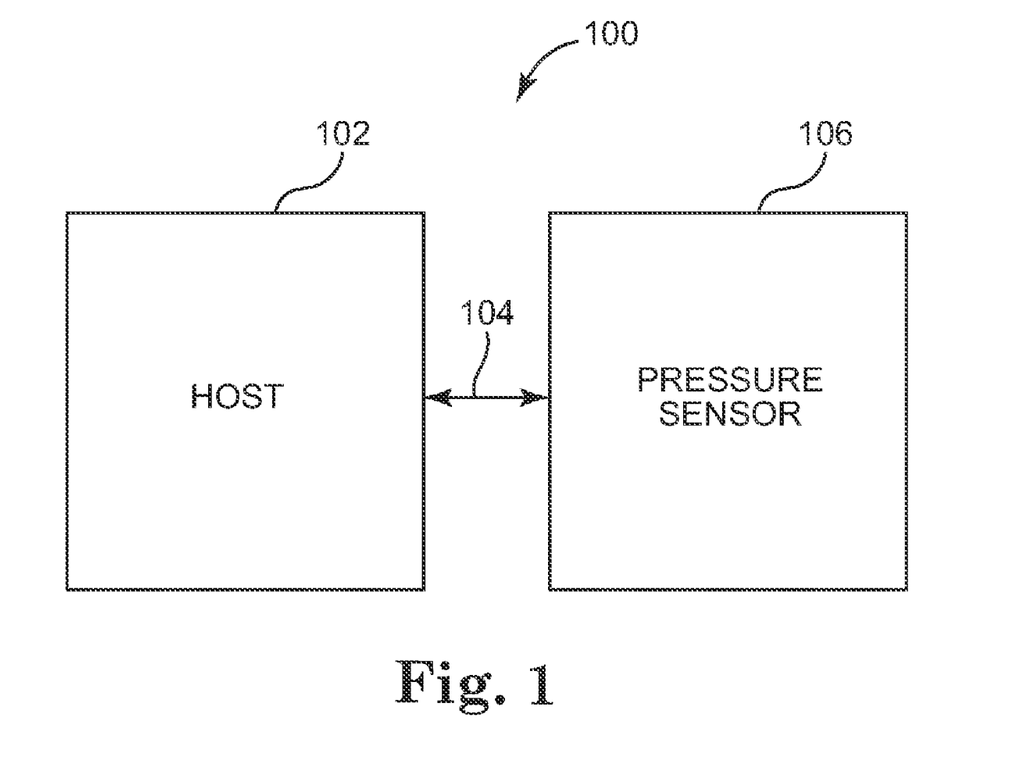
FIG. 1 is a block diagram illustrating one embodiment of a system.

FIG. 1 is a block diagram illustrating one embodiment of a system 100. System 100 includes a host 102 and a pressure sensor 106. Host 102 is communicatively coupled to pressure sensor 106 through communication link 104. Host 102 includes a microprocessor, computer, controller, or any other suitable device for receiving data from pressure sensor 106. Pressure sensor 106 communicates pressure data to host 102 though communication link 104. In one embodiment, communication link 104 is a wireless communication link.

In one embodiment, pressure sensor 106 is integrated in an ultra low-cost single chip in a complementary metal-oxide-semiconductor (CMOS) process. Pressure sensor 106 includes a first cavity parallel to a second cavity and a pressure sensitive longitudinal lamella between the first and second cavities. The first cavity is a buried cavity, and the second cavity is open to the atmosphere. As used herein, the atmosphere may include a gas or a liquid. Pressure sensor 106 includes sensor elements for sensing pressure within the second cavity on the lamella. The sensor elements can include capacitive elements, stress sensitive transistors, piezo resistor elements, or other suitable sensor elements. In one embodiment, pressure sensor 106 includes an array of vertical sensor cavities and associated sensor elements to increase sensitivity and reliability. Pressure sensor 106 consumes a minimal area and in one embodiment is integrated as part of an application-specific integrated circuit (ASIC).

Figure 2:
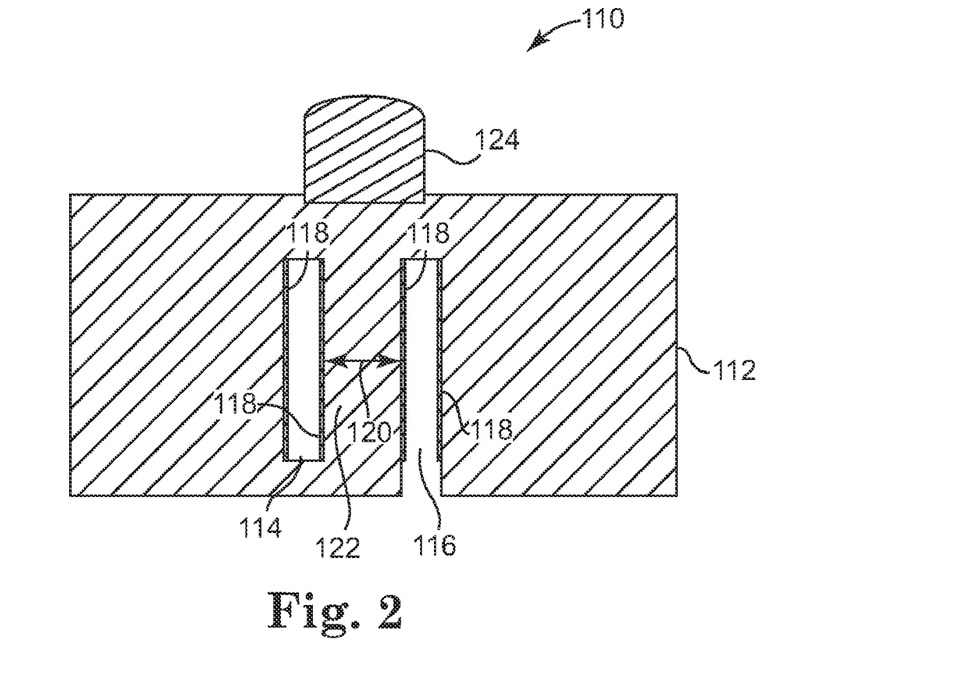
FIG. 2 illustrates a cross-sectional view of one embodiment of a pressure sensor.

FIG. 2 illustrates a cross-sectional view of one embodiment of a pressure sensor 110. In one embodiment, pressure sensor 110 provides pressure sensor 106 previously described and illustrated with reference to FIG. 1. Pressure sensor 110 includes a substrate 112, a first cavity 114, a second cavity 116, capacitive sensor elements 118, a lamella 122, and a logic device 124. Substrate 112 includes a silicon substrate or another suitable substrate.

First cavity 114 is oriented vertically within substrate 112 and completely buried within or enclosed by substrate 112. Second cavity 116 is also oriented vertically within substrate 112 and is open to the atmosphere. In one embodiment, second cavity 116 is open to the atmosphere on the backside of substrate 112. First cavity 114 is parallel to second cavity 116 such that lamella 122 is defined between first cavity 114 and second cavity 116. Lamella 122 is sensitive to pressure and deflects based on the pressure within second cavity 116. The sensitivity of pressure sensor 110 is based on the lamella material, the lamella thickness, and the amount of overlap of first cavity 114 and second cavity 116.

Capacitive sensor elements 118 are formed on the sidewalls of first cavity 114 and second cavity 116. In one embodiment, capacitive sensor elements 118 are formed by doping the sidewalls of first cavity 114 and second cavity 116. In response to a change in pressure on lamella 122 as indicated at 120, the distance between sensor elements 118 and therefore the capacitance of sensor elements 118 changes. In this way, the capacitance of sensor elements 118 provides an indication of the pressure within second cavity 116. In one embodiment, a logic device 124 or logic devices are coupled to capacitive sensor elements 118 to measure the capacitance and provide an output indicating the pressure on lamella 122.

Figure 3:
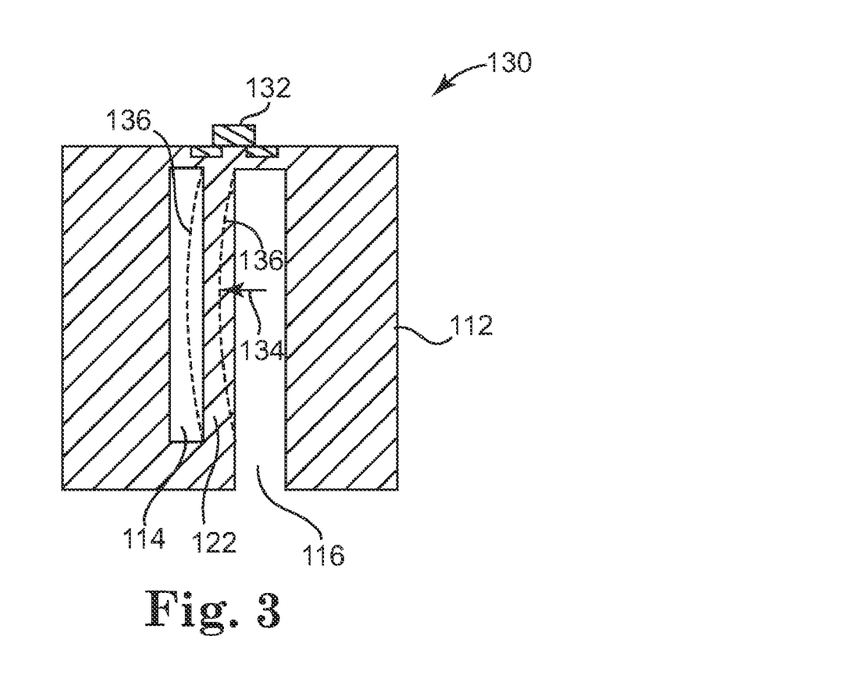
FIG. 3 illustrates a cross-sectional view of another embodiment of a pressure sensor.

FIG. 3 illustrates a cross-sectional view of another embodiment of a pressure sensor 130. In one embodiment, pressure sensor 130 provides pressure sensor 106 previously described and illustrated with reference to FIG. 1. Pressure sensor 130 includes substrate 112, first cavity 114, second cavity 116, lamella 122, and a stress sensitive transistor 132. In one embodiment, stress sensitive transistor 132 includes a stress sensitive metal-oxide-semiconductor field-effect transistor (MOSFET) or another suitable stress sensitive transistor.

In this embodiment, pressure from the atmosphere within second cavity 116 as indicated at 134 deflects lamella 122 as indicated at 136. The current through stress sensitive transistor 132 varies based on the deflection of lamella 122. In this way, the current through stress sensitive transistor 132 provides an indication of the pressure within second cavity 116.

Figure 4:
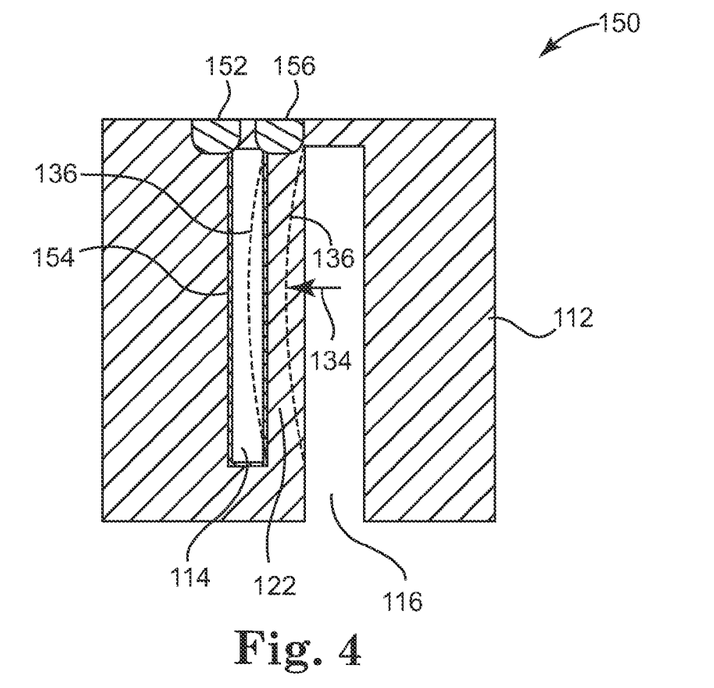
FIG. 4 illustrates a cross-sectional view of another embodiment of a pressure sensor.

FIG. 4 illustrates a cross-sectional view of another embodiment of a pressure sensor 150. In one embodiment, pressure sensor 150 provides pressure sensor 106 previously described and illustrated with reference to FIG. 1. Pressure sensor 150 includes substrate 112, first cavity 114, second cavity 116, lamella 122, and a piezo resistor 152. As indicated at 154, piezo resistor 152 is formed on the sidewalls and bottom of first cavity 114 via doping or another suitable method. Piezo resistor 152 also includes contacts 156 for electrically coupling piezo resistor 152 to a sensing circuit.

In this embodiment, pressure from the atmosphere within second cavity 116 as indicated at 134 deflects lamella 122 as indicated at 136. The resistance of piezo resistor 152 varies based on the deflection of lamella 122. In this way, the resistance of piezo resistor 152 provides an indication of the pressure within second cavity 116.

Figure 5:
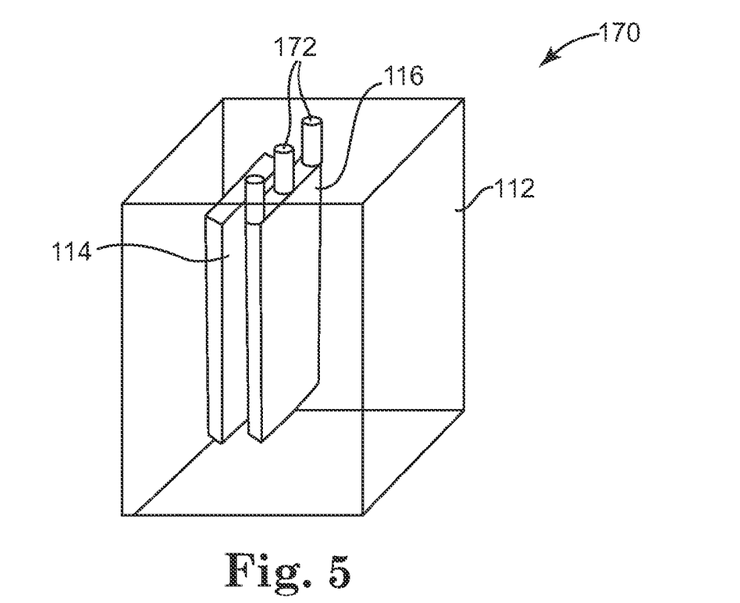
FIG. 5 is a diagram illustrating another embodiment of a pressure sensor.

FIG. 5 is a diagram illustrating another embodiment of a pressure sensor 170. In one embodiment, pressure sensor 170 provides pressure sensor 106 previously described and illustrated with reference to FIG. 1. Pressure sensor 170 includes substrate 112, first cavity 114, second cavity 116, and sensor elements (not shown). In this embodiment, second cavity 116 is open to the atmosphere on the front side of substrate 112 as indicated at 172. Pressure sensor 170 can include capacitive sensor elements as previously described and illustrated with reference to FIG. 2, stress sensitive transistor sensor elements as previously described and illustrated with reference to FIG. 3, piezo resistor sensor elements as previously described and illustrated with reference to FIG. 4, or other suitable sensor elements.

Figure 6:
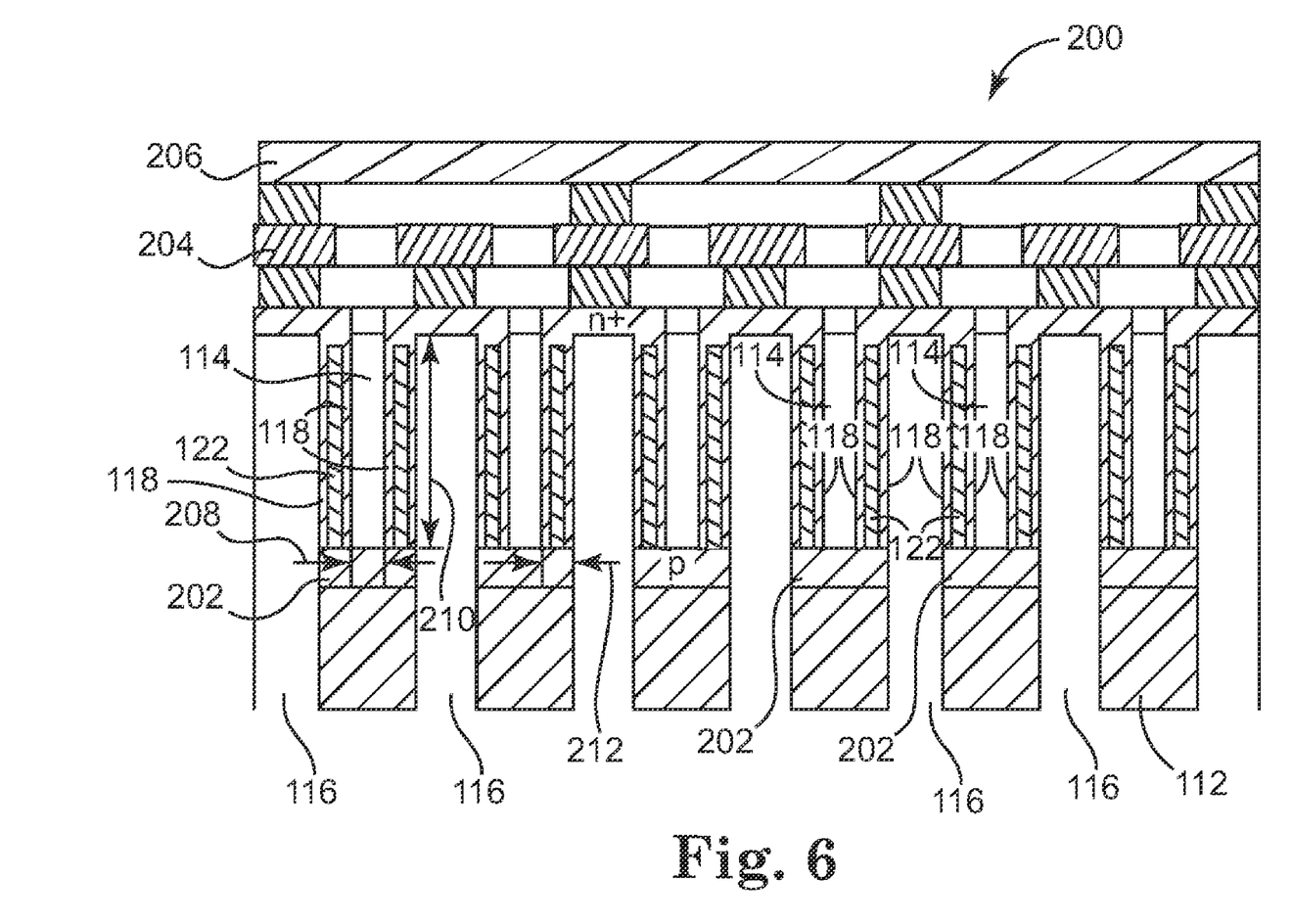
FIG. 6 illustrates a cross-sectional view of another embodiment of a pressure sensor.

FIG. 6 illustrates a cross-sectional view of another embodiment of a pressure sensor 200. In one embodiment, pressure sensor 200 provides pressure sensor 106 previously described and illustrated with reference to FIG. 1. Pressure sensor 200 is similar to pressure sensor 110 previously described and illustrated with reference to FIG. 2, except that pressure sensor 200 includes an array of cavities and associated sensor elements.

Pressure sensor 200 includes substrate 112, a plurality of first cavities 114, a plurality of second cavities 116, a plurality of capacitive sensor elements 118, a plurality of lamellas 122, a first metallization layer 204, and a second metallization layer 206. In this embodiment, capacitive sensor elements 118 are formed by n+ type doping of substrate 112. Capacitive sensor elements 118 are isolated from each other by p type doping of substrate 112 to provide p type doped regions 202. In another embodiment, capacitive sensor elements 118 are formed by p+ type doping of substrate 112 and are isolated from each other by n+ type doping of substrate 112 to provide n+ type doped regions 202. First metallization layer 204 and second metallization layer 206 are electrically coupled to capacitive sensor elements 118 to provide sense signals from capacitive sensor elements 118 to a sensor circuit. In other embodiments, capacitive sensor elements 118 are replaced with stress sensitive transistors, piezo resistors, or other suitable sensing elements for sensing the pressure on lamellas 122 due to pressure within second cavities 116.

In one embodiment, the width of each first cavity 114 as indicated at 208 is between approximately 50 nm and 150 nm. The height of each first cavity 114 as indicated at 210 is between approximately 2 μm and 15 μm. The width of each lamella 122 as indicated at 212 is between approximately 100 nm and 500 nm. In other embodiments, other suitable dimensions are used to provide the desired sensitivity and working range.

Pressure sensor 200 can include any suitable number of cavities and associated sensor elements, such as 10, 20, or another suitable number. By including multiple cavities and associated sensor elements, the sensitivity of the pressure sensor can be increased. In addition, if one or more of the cavities becomes blocked or if one or more of the sensor elements fail, the remaining cavities and associated sensor elements can still sense the pressure and provide an output indicating the pressure, thereby increasing the reliability of the pressure sensor.

Figure 7:
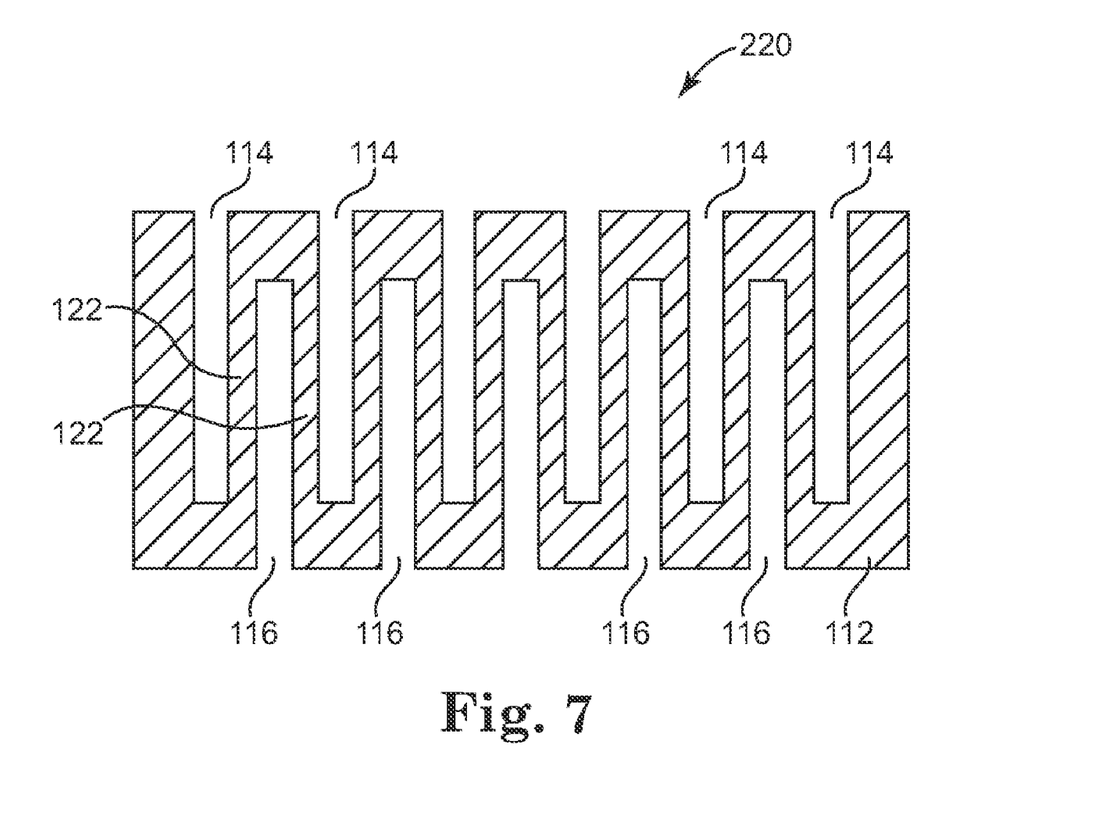
FIG. 7 illustrates a cross-sectional view of another embodiment of a pressure sensor.

FIG. 7 illustrates a cross-sectional view of another embodiment of a pressure sensor 220. Pressure sensor 220 is a differential pressure sensor and includes an array of cavities and associated sensor elements (not shown). Pressure sensor 220 includes substrate 112, a plurality of first cavities 114, a plurality of second cavities 116, and a plurality of lamellas 122. First cavities 114 are open to the atmosphere on the front side of substrate 112. Second cavities 116 are open to the atmosphere on the backside of substrate 112. Lamellas 122 deflect based on pressure from the atmosphere on the front side of pressure sensor 220 within first cavities 114 and based on pressure from the atmosphere on the backside of pressure sensor 220 within second cavities 116. Therefore, capacitive sensor elements, stress sensitive transistor sensor elements, piezo resistor sensor elements, or other suitable sensor elements can sense the pressure on lamellas 122 to provide a differential pressure value between the front side and backside of pressure sensor 220.

The following FIGS. 8-11 illustrate embodiments of a method for fabricating a pressure sensor, such as pressure sensor 110 previously described and illustrated with reference to FIG. 2, pressure sensor 130 previously described and illustrated with reference to FIG. 3, pressure sensor 150 previously described and illustrated with reference to FIG. 4, or other suitable pressure sensor utilizing parallel vertical cavities.

Figure 8:
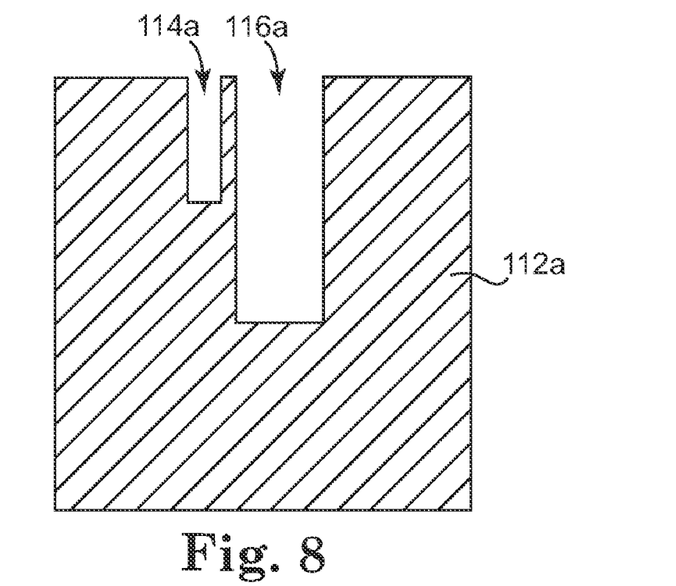
FIG. 8 illustrates a cross-sectional view of one embodiment of a substrate after etching.

FIG. 8 illustrates a cross-sectional view of one embodiment of a substrate 112a after etching. A substrate, such as a silicon substrate or another suitable substrate is etched to provide a first opening 114a and a second opening 116a. In one embodiment, first opening 114a and second opening 116a are trenches. In one embodiment, a single mask is formed over the substrate to define the width of first opening 114a and the width of second opening 116a. In one embodiment, the width of second opening 116a is defined to be greater than the width of first opening 114a.

A deep trench (DT) etch is then used to etch the substrate to simultaneously form first opening 114a and second opening 116a. Since the width of second opening 116a is greater than the width of first opening 114a, the DT-etch etches second opening 116a faster than first opening 114a such that second opening 116a is deeper than first opening 114a. In another embodiment, two masks are used such that first opening 114a and second opening 116a are etched separately.

In one embodiment, a dielectric thin film is conformally deposited within first opening 114a and second opening 116a to improve ambience robustness. In another embodiment, an electrically conductive thin film is conformally deposited on the sidewalls of first opening 114a and second opening 116a to provide conductive plates for capacitive sensor elements. In another embodiment, after first opening 114a and second opening 116a are etched, substrate 112a is doped to provide portions of capacitive sensor elements or piezo resistor sensor elements within first opening 114a and/or second opening 116a.

Figure 9:
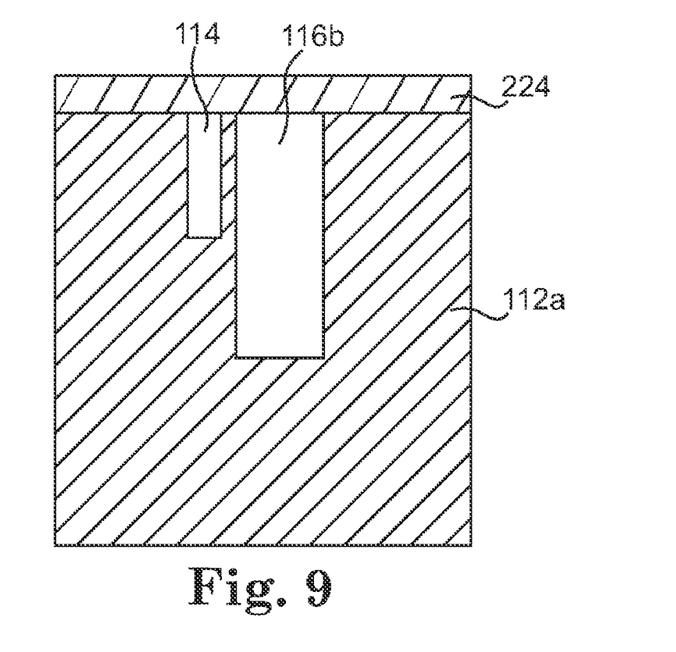
FIG. 9 illustrates a cross-sectional view of one embodiment of the substrate and an epitaxial (EPI) or dielectric layer.

FIG. 9 illustrates a cross-sectional view of one embodiment of substrate 112a and an epitaxial (EPI) or dielectric layer 224. In one embodiment, silicon or another suitable material is deposited over substrate 112a, first opening 114a, and second opening 116a to provide EPI layer 224. In another embodiment, a dielectric material is deposited with a sufficient non-conformal deposition component over substrate 112a, first opening 114a, and second opening 116a to provide dielectric layer 224. EPI or dielectric layer 224 closes or seals first opening 114a to provide first cavity 114 and closes or seals second opening 116a to provide second cavity 116b. In other embodiments, other suitable methods are used to close or seal first opening 114a and close or seal second opening 116a. In one embodiment, after EPI or dielectric layer 224 is deposited, EPI or dielectric layer 224 is doped to complete the capacitive sensor elements or piezo resistor sensor elements.

Figure 10:
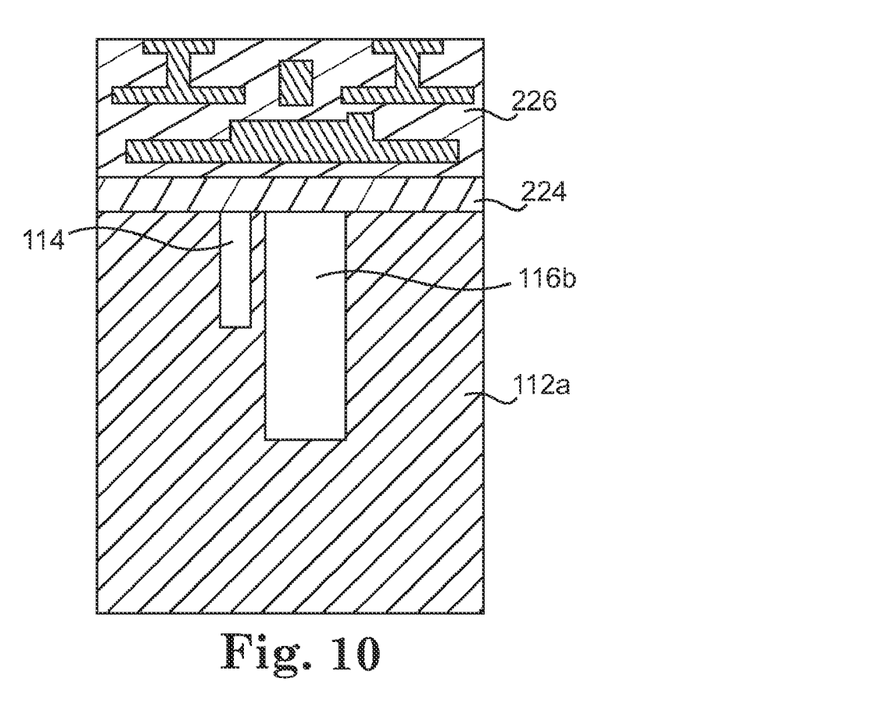
FIG. 10 illustrates a cross-sectional view of one embodiment of the substrate, the EPI or dielectric layer, and logic devices.

FIG. 10 illustrates a cross-sectional view of one embodiment of substrate 112a, EPI or dielectric layer 224, and logic devices 226. Logic devices 226 and/or other structures are fabricated on EPI or dielectric layer 224. In one embodiment, logic devices 226 are fabricated using CMOS fabrication processes or other suitable fabrication processes. In one embodiment, logic devices 226 provide an ASIC or another suitable integrated circuit.

Figure 11:
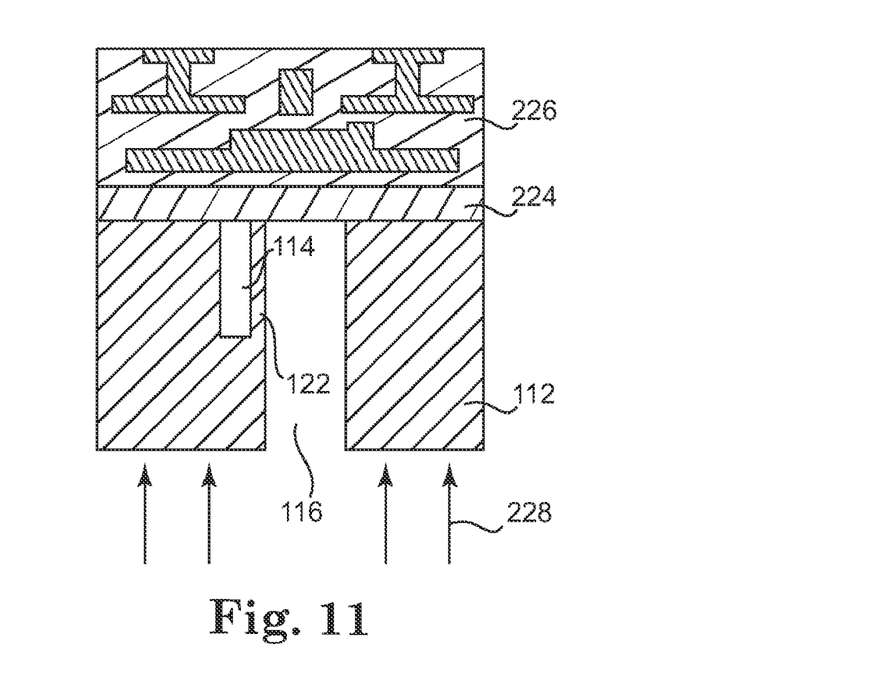
FIG. 11 illustrates a cross-sectional view of one embodiment of the substrate, the EPI or dielectric layer, and the logic devices after thinning the backside of the substrate.

FIG. 11 illustrates a cross-sectional view of one embodiment of substrate 112, EPI or dielectric layer 224, and logic devices 226 after thinning the backside of substrate 112a. The backside of substrate 112a is thinned as indicated at 228 to expose second cavity 116b to provide second cavity 116 and substrate 112. In one embodiment, the backside of substrate 112a is thinned using chemical mechanical planarization (CMP), etching (e.g., wet-etch, reactive-ion etch (RIE)), grinding, a combination thereof, or another suitable thinning process to complete the fabrication of the integrated circuit including the pressure sensor. In another embodiment, a portion of the backside of substrate 112 is etched to expose second cavity 116b to provide second cavity 116.

Embodiments provide pressure sensors that are low cost and integrated on a single chip with logic devices. Embodiments of the pressure sensors are fabricated using CMOS fabrication processes and consume a minimal area. The sensor cavities and sense elements can be defined for the desired sensitivity and working range. In one embodiment, a plurality of cavities and associated sensor elements are combined into an array for increased sensitivity and reliability.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor device comprising:
a first cavity within a semiconductor substrate;
a second cavity within the semiconductor substrate, the second cavity open to an atmosphere and defining a first lamella between the first cavity and the second cavity; and
a first sense element configured for sensing a pressure on the first lamella.

2. The semiconductor device of claim 1, wherein the second cavity is open to the atmosphere on a front side of the semiconductor substrate.

3. The semiconductor device of claim 1, wherein the second cavity is open to the atmosphere on a backside of the semiconductor substrate.

4. The semiconductor device of claim 1, wherein the first cavity is open to the atmosphere on a first side of the semiconductor substrate, and
wherein the second cavity is open to the atmosphere on a second side of the semiconductor substrate.

5. The semiconductor device of claim 1, further comprising:
a third cavity within the semiconductor substrate, the third cavity defining a second lamella between the third cavity and the second cavity; and
a second sense element configured for sensing a pressure on the second lamella.

6. The semiconductor device of claim 5, further comprising:
a fourth cavity within the semiconductor substrate, the fourth cavity open to the atmosphere and defining a third lamella between the fourth cavity and the third cavity; and
a third sense element configured for sensing a pressure on the third lamella.

7. The semiconductor device of claim 1, wherein the sense element comprises a capacitive element.

8. The semiconductor device of claim 1, wherein the sense element comprises a transistor.

9. The semiconductor device of claim 1, wherein the sense element comprises a piezo resistor.

10. An integrated pressure sensor comprising:
a first enclosed trench within a semiconductor substrate;
a second open trench within the semiconductor substrate, the second trench positioned to define a longitudinal lamella between the first trench and the second trench; and a sense element configured for sensing a pressure on the lamella.

11. The pressure sensor of claim 10, further comprising:
logic elements fabricated over the first trench and the second trench.

12. The pressure sensor of claim 10, wherein the first trench has a depth between approximately 2 μm and 15 μm,
wherein the first trench has a width between approximately 50 nm and 150 nm, and
wherein the lamella has a width between approximately 100 nm and 500 nm.

13. A method for fabricating a semiconductor device, the method comprising:
etching a first opening into a substrate;
etching a second opening into the substrate to define a lamella between the first opening and the second opening;
fabricating a sense element for sensing a pressure on the lamella;
closing the first opening and the second opening; and
exposing the second opening to an atmosphere.

14. The method of claim 13, wherein etching the second opening comprises etching the second opening to a depth greater than a depth of the first opening, and
wherein exposing the second opening to the atmosphere comprises thinning a side of the substrate to expose the second opening.

15. The method of claim 14, wherein etching the first opening and etching the second opening comprises using a deep trench etch to simultaneously etch the first opening having a first width and the second opening having a second width greater than the first width.

16. The method of claim 14, wherein thinning the side of the substrate comprises chemical-mechanical planarizing the side of the substrate.

17. The method of claim 14, wherein thinning the side of the substrate comprises etching or grinding the side of the substrate.

18. The method of claim 13, wherein etching the first opening comprises etching a first trench into the substrate, and
wherein etching the second opening comprises etching a second trench into the substrate.

19. The method of claim 13, wherein fabricating the sense element comprises fabricating a capacitive sense element.

20. The method of claim 13, wherein fabricating the sense element comprises fabricating a transistor sense element.

21. The method of claim 13, wherein fabricating the sense element comprises fabricating a piezoresistive sense element.

22. A method for fabricating an integrated pressure sensor, the method comprising:
etching a first trench to a first depth into a first side of a substrate;
etching a second trench to a second depth greater than the first depth into the first side of the substrate to define a first longitudinal lamella between the first trench and the second trench;
fabricating a first sense element for sensing a pressure on the first lamella;
depositing a semiconductor material or a dielectric material over the first trench and the second trench on the first side of the substrate to provide a first sealed cavity and a second sealed cavity; and
thinning a second side of the substrate to open the second sealed cavity to atmosphere.

23. The method of claim 22, wherein etching the first trench and etching the second trench comprises using a deep trench etch to simultaneously etch the first trench having a first width and the second trench having a second width greater than the first width.

24. The method of claim 22, further comprising:
etching a third trench to the first depth into the first side of the substrate to define a second longitudinal lamella between the third trench and the second trench; and
fabricating a second sense element for sensing a pressure on the second lamella,
wherein depositing the semiconductor material comprises depositing the semiconductor material over the third trench on the first side of the substrate to provide a third sealed cavity.

25. The method of claim 24, further comprising:
etching a fourth trench to the second depth into the first side of the substrate to define a third longitudinal lamella between the fourth trench and the third trench; and
fabricating a third sense element for sensing a pressure on the third lamella,
wherein depositing the semiconductor material comprises depositing the semiconductor material over the fourth trench on the first side of the substrate to provide a fourth sealed cavity, and
wherein thinning the second side of the substrate comprises thinning the second side of the substrate to open the fourth sealed cavity to atmosphere.

* * * * *